(12) United States Patent
Cox et al.

(10) Patent No.: US 7,902,989 B2
(45) Date of Patent: *Mar. 8, 2011

(54) OPTICAL SWITCH

(76) Inventors: Raleigh L. Cox, Baton Rouge, LA (US); Christopher E. Cox, Baton Rouge, LA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/577,572

(22) Filed: Oct. 12, 2009

(65) Prior Publication Data
US 2010/0066548 A1 Mar. 18, 2010

Related U.S. Application Data

(63) Continuation-in-part of application No. 11/756,397, filed on May 31, 2007, now Pat. No. 7,714,732.

(51) Int. Cl.
*G08B 21/00* (2006.01)

(52) U.S. Cl. .......................................... 340/619; 250/901

(58) Field of Classification Search .................. 340/619, 340/623–625; 362/101, 802; 250/900–908
See application file for complete search history.

(56) References Cited

U.S. PATENT DOCUMENTS

| | | | |
|---|---|---|---|
| 3,082,400 A | 3/1963 | Coop | |
| 3,863,067 A | 1/1975 | Gooley | |
| 4,051,723 A | 10/1977 | Head et al. | |
| 4,064,754 A | 12/1977 | Frey | |
| 4,091,671 A | 5/1978 | McLees | |
| 4,156,149 A | 5/1979 | Vaccari | |
| 4,519,257 A | 5/1985 | Simpkins | |
| 4,629,841 A | 12/1986 | Riback et al. | |
| 4,801,926 A * | 1/1989 | Bitetti | 340/624 |
| 4,836,632 A | 6/1989 | Bardoorian | |
| 4,856,874 A | 8/1989 | Tusting | |
| 4,938,590 A | 7/1990 | Ishida | |
| 5,017,748 A | 5/1991 | Sapiro | |
| 5,072,617 A | 12/1991 | Weiss | |
| 5,105,663 A * | 4/1992 | Kuhlen | 340/623 |
| 5,124,686 A * | 6/1992 | White et al. | 340/624 |
| 5,130,535 A | 7/1992 | Kummer et al. | |

(Continued)

FOREIGN PATENT DOCUMENTS

JP 357042817 A 3/1982

(Continued)

OTHER PUBLICATIONS

Corning, Corning ClearCurve Optical Fiber, 4—Page Brochure printed from www.corning.com/clearcurve website, copyright 2008, Corning Incorporated.

(Continued)

*Primary Examiner* — John A Tweel, Jr.
(74) *Attorney, Agent, or Firm* — Jones, Walker, Waechter, Poitevent, Carrere & Denegre, L.L.P.

(57) ABSTRACT

An optical switch having a housing, a light source and a light detector. The light source and light detector are located remote from the housing. The light source is connected to the housing with a first light guide, and the light detector is connected to the housing with a second light guide. The first and second light guide cables have distal ends positioned through the housing and are optically aligned but separated by a gap. The switch includes a device to interrupt a light beam that is usually adapted to removably occupy the gap. The switch may be embodied in a float.

30 Claims, 18 Drawing Sheets

U.S. PATENT DOCUMENTS

| | | | |
|---|---|---|---|
| 5,373,153 | A | 12/1994 | Cumberledge et al. |
| 5,585,786 | A | 12/1996 | Clark et al. |
| 5,684,296 | A | 11/1997 | Hamblin et al. |
| 5,743,135 | A | 4/1998 | Sayka et al. |
| 5,874,899 | A | 2/1999 | Barmore et al. |
| 5,950,487 | A | 9/1999 | Maresca et al. |
| 6,125,218 | A | 9/2000 | Humphrey |
| 6,555,837 | B2 * | 4/2003 | Benton .................. 340/619 |
| 6,650,820 | B2 | 11/2003 | Ross et al. |
| 6,727,822 | B2 * | 4/2004 | Chamberlin et al. ......... 340/620 |
| 6,832,035 | B1 | 12/2004 | Daoud et al. |
| 7,234,830 | B1 * | 6/2007 | Cox et al. .................. 362/802 |
| 7,272,289 | B2 | 9/2007 | Bickham et al. |
| 7,444,042 | B1 | 10/2008 | Niblock et al. |
| 7,714,732 | B2 * | 5/2010 | Cox et al. .................. 340/619 |
| 7,772,538 | B2 | 8/2010 | Cox et al. |
| 2006/0139177 | A1 * | 6/2006 | Gomery .................. 340/624 |

FOREIGN PATENT DOCUMENTS

JP       07218847 A      8/1995

OTHER PUBLICATIONS

PCT Search Report in PCT/US2010/024110 dated Apr. 15, 2010.

PCT Search Report in PCT/US2007/70122 dated Mar. 27, 2008.

* cited by examiner

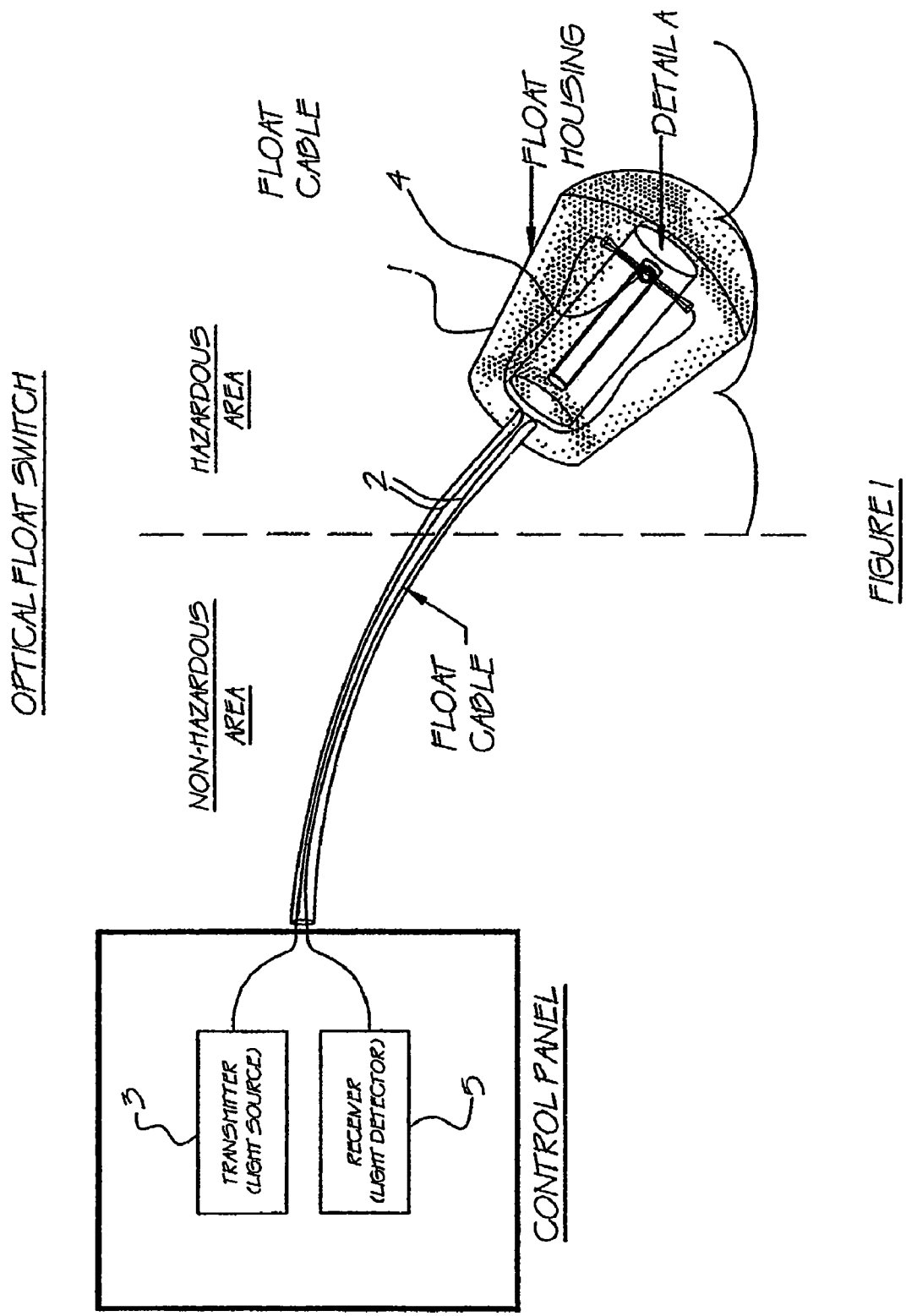

Detail A

*Detail A*

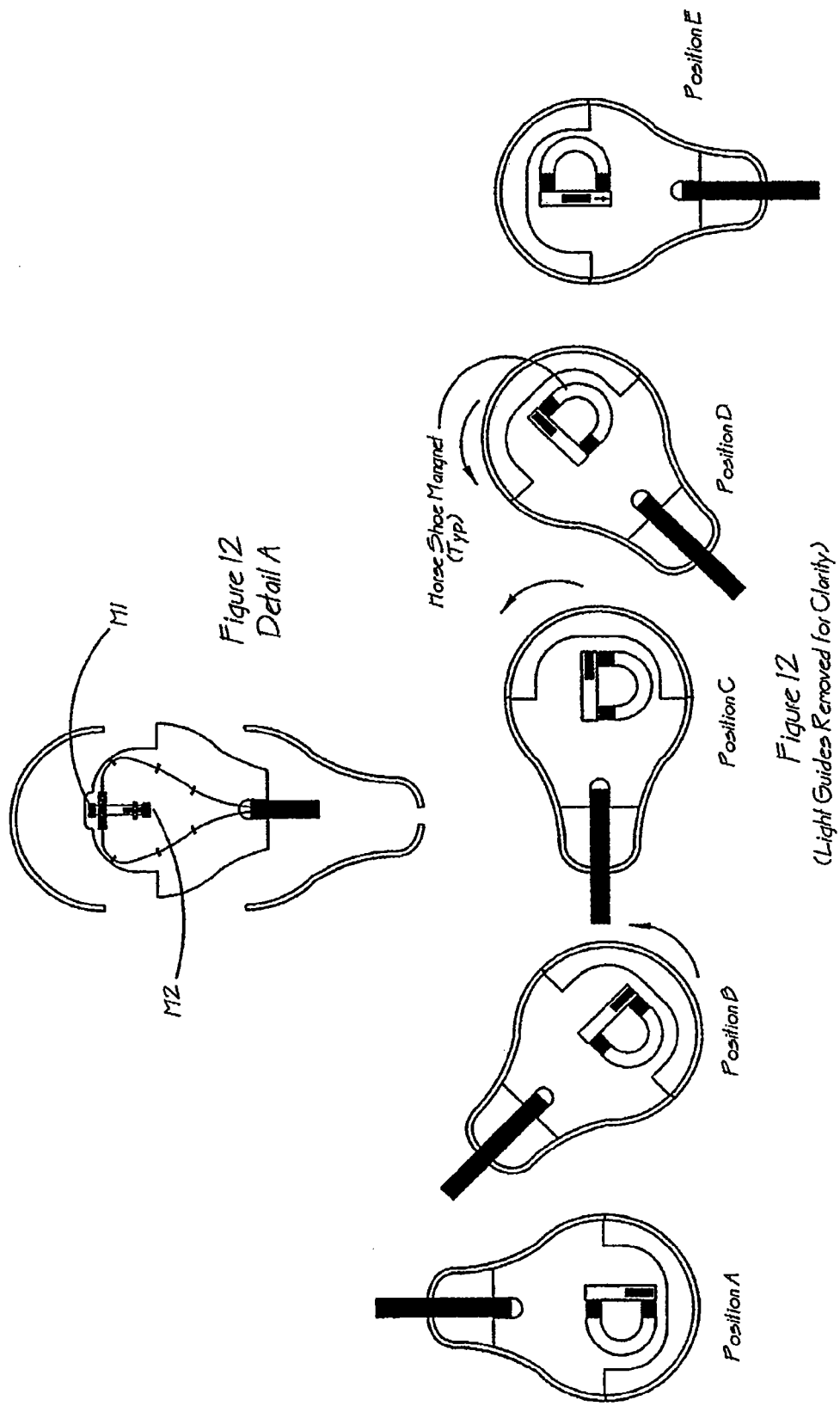

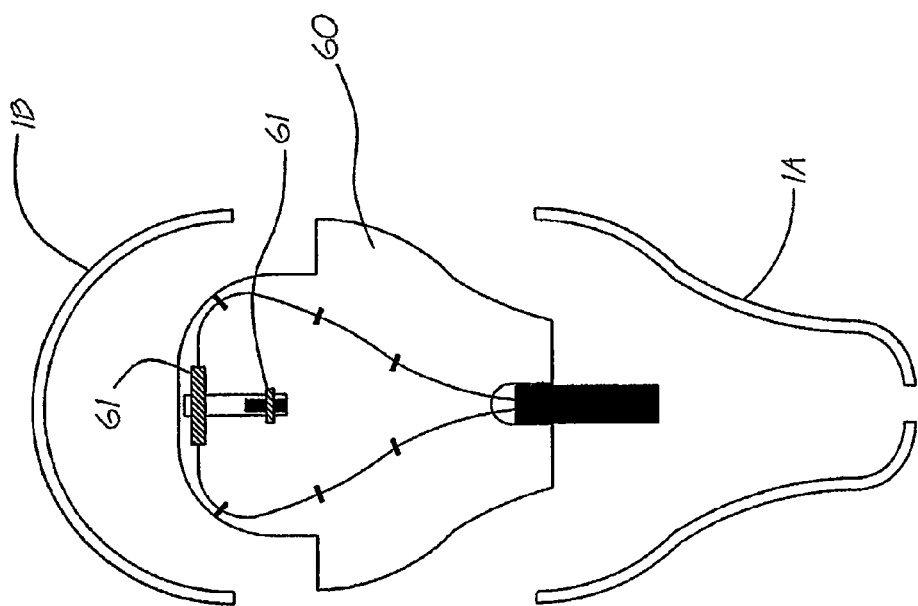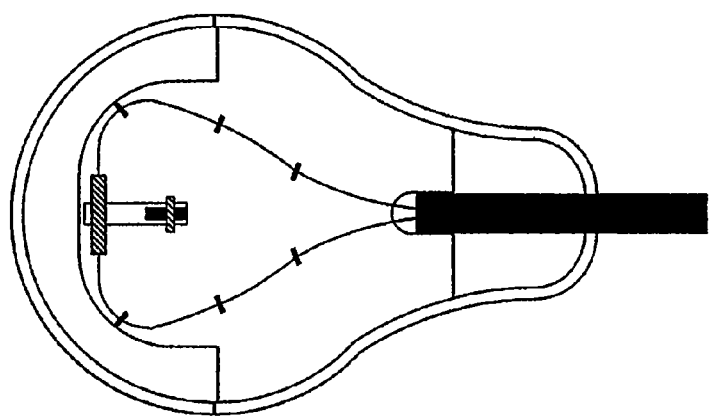
Figure 14

CABLE ASSEMBLY

OPTICAL SWITCH

PRIORITY CLAIM

This application is a continuation in part of U.S. Ser. No. 11/756,397 filed on May 31, 2007 now U.S. Pat. No. 7,714,732, and this application claims priority thereto and the contents of which are hereby incorporated by reference.

FIELD OF INVENTION

The invention relates to switches used primarily in hazardous environments, such as switches used in liquid level detection in tanks or switches to activate equipment within a hazardous environment.

BACKGROUND OF THE INVENTION

Many working environments present explosion hazards or present a risk of electrical shock. One hazardous environment is a pumping station or a tank that contains hazardous and/or flammable or volatile gases or liquids and chemicals to be pumped. Float switches are commonly used in applications of this sort to detect level for activation of a pump (see FIG. 2), but float switches generally have electrical current that passes through wires and a switch housed within the float, such as a mercury switch located in the float. Wires from the float switch run to a control panel (or other device) located external to the tank or pit and are located outside the hazardous area. Some specialty control panels are explosion proof and can be located in the hazardous area. As liquids rise in the tank, the float tilts and a ball or conductive liquid, such as mercury, moves and makes contact with an electrical switch or contacts of some sort causing the switch to activate. Electrical current then passes from the control panel through the wires, to the switch, completing the circuit. These all present a spark hazard, and if a breakdown in insulation occurs along the electrical path, an explosion can result.

Some tanks containing flammable liquids or gases use ultrasonic level detection which sends a sonic burst to the surface of the liquid and then back. The transit time of the beam is used to determine the liquid level (some alternative devices use radar or microwave radiation as an energy packet instead of a sound wave, and other sensing technologies are used in level detection, e.g. magnetostrictive, submersible pressure transducers, bubblers, capacitance, etc.). No electrical current is used within the tank or pit and the transmitter and receiver are located external to the hazardous atmosphere, usually mounted on the external tank surface, with the sensing device positioned in the tank. This technique is not generally used to remotely signal a device, such as a signal to engage/disengage a pump (such as a dosing pump) at discrete levels, as these level detectors will detect all fluid levels requiring additional logic circuits to select a predetermined height or level for operation of a pump, thereby raising the complexity and expense of such as system.

In some hazardous environments, explosion proof containers are used to contain equipment or devices that may present a possible sparking hazard, such as controls, pumps, motors, etc. While pumps or other devices located in a hazardous environment may be contained in an explosion proof housing, these devices must be activated or deactivated by electrical signals (e.g. providing power to the device). Activation is done remotely from the hazardous environment to reduce the possibility of explosion. Hence, when an operator is onsite, the operator cannot manually activate/deactivate the device within the hazardous area unless the activation device is in an explosion proof housing. It would be desirable to have a switch located within the hazardous environment that could be used to manually activate/deactivate the powered device, and have the switch not present an arcing hazard, and would not have to be located in an explosion proof housing.

SUMMARY OF THE INVENTION

The invention is an optically activated switch for use in a hazardous environment, (non-hazardous environments also are contemplated) and in one embodiment, the switch activation components are contained in a floatable housing and used to signal the need to operate a pump or other device. As discussed, a switch is a device having a status (on/off, make/break, open/closed or other status indicator) that can be used to control an electrical device. The switch invention uses a light beam from a transmitter located outside of the hazardous atmosphere ("outside the hazardous environment" includes a location within an explosion proof container or housing) which travels through a light carrying cable, fiber, tube or light guide (all considered a "light guide") to a switch means located in a hazardous area. Based on the position or "status" of the switch (optical path interrupted, or optical path complete), the light can travel to a powered light detector or receiver located outside the hazardous area, which detects the status of the switch, and circuitry can act on the status to activate or deactivate a powered device, such as a pump or motor. Several means of breaking or interrupting the light path can be utilized. The controller to which the switch is connected can be configured to activate a pump or device upon detection of the light or detection of the lack of the light.

OBJECTS OF THE INVENTION

It is an object of the invention to have a switch that uses no source of electrical current or electrical resistance at the switch location.

BRIEF DESCRIPTION OF THE DRAWINGS

FIG. 1A is a detail of the float of FIG. 1.
FIG. 4A is a detail of the separator assembly of the float of FIG. 4.
FIG. 12 Detail A is an exploded cross section of one embodiment of a float having a paddle separator assembly.
FIG. 12 is a cartoon showing a magnet used to delay operation of the switch through a pre-selected range of motion.

FIG. 14 depicts a float embodiment of the switch using a paddle insert separator assembly.

DETAILED DESCRIPTION OF THE INVENTION

Figure 1:
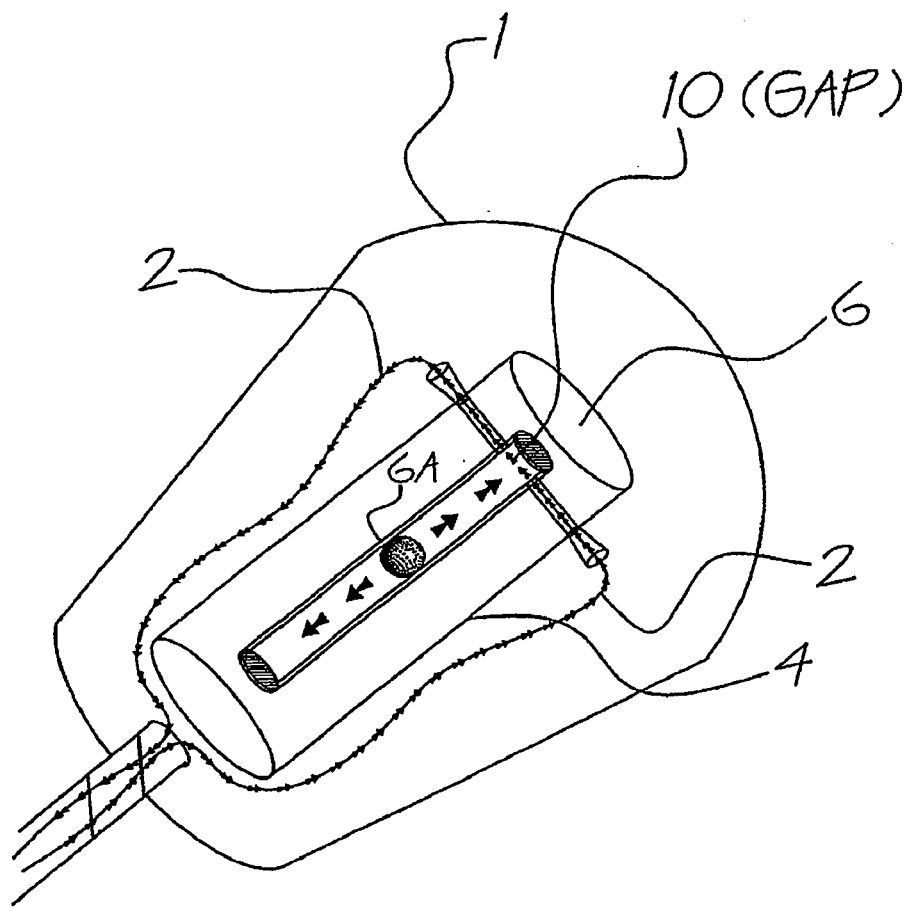
FIG. 1 depicts an optically activated float.
Figure 2:
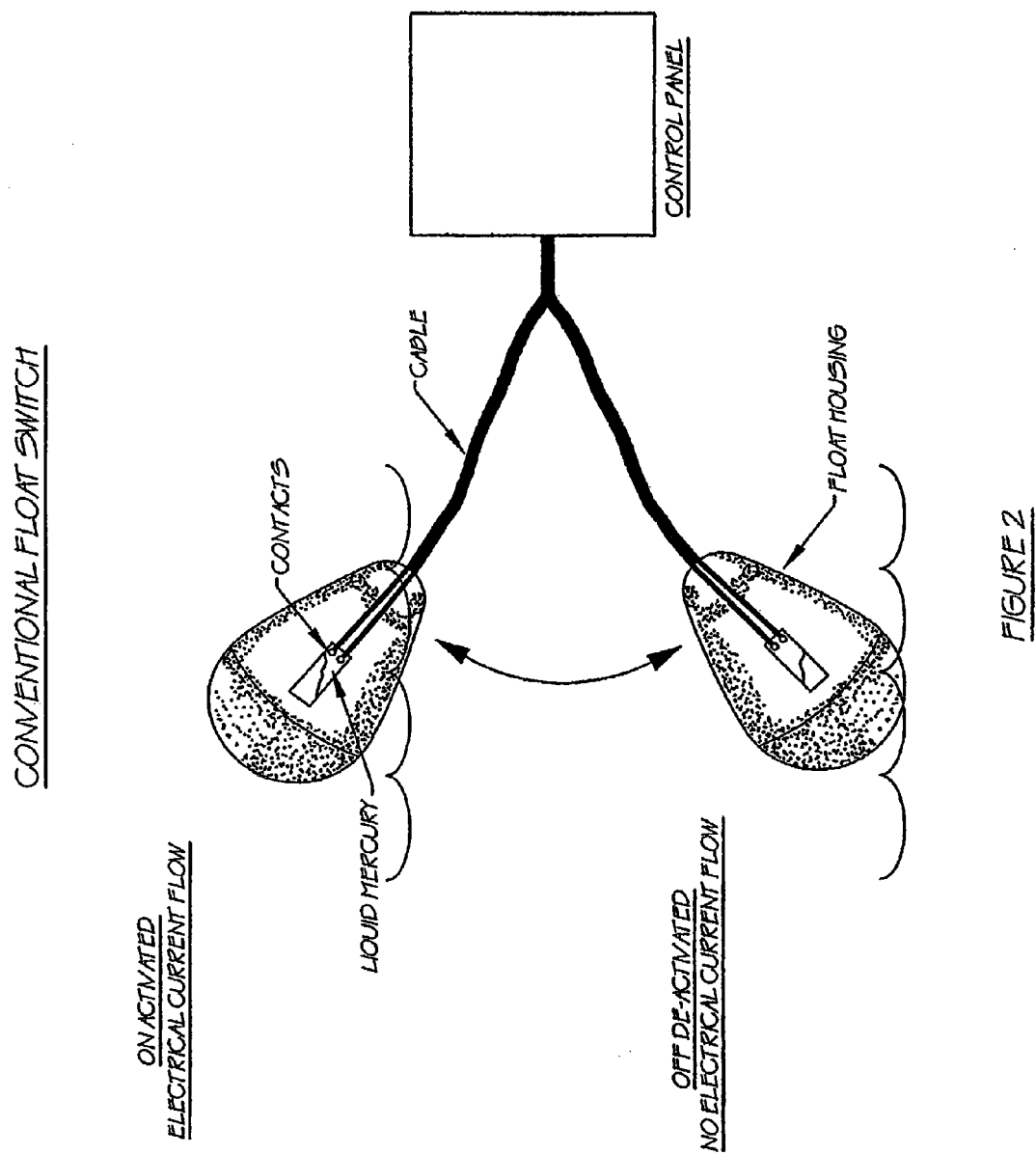
FIG. 2 depicts a conventional float.
Figure 3:
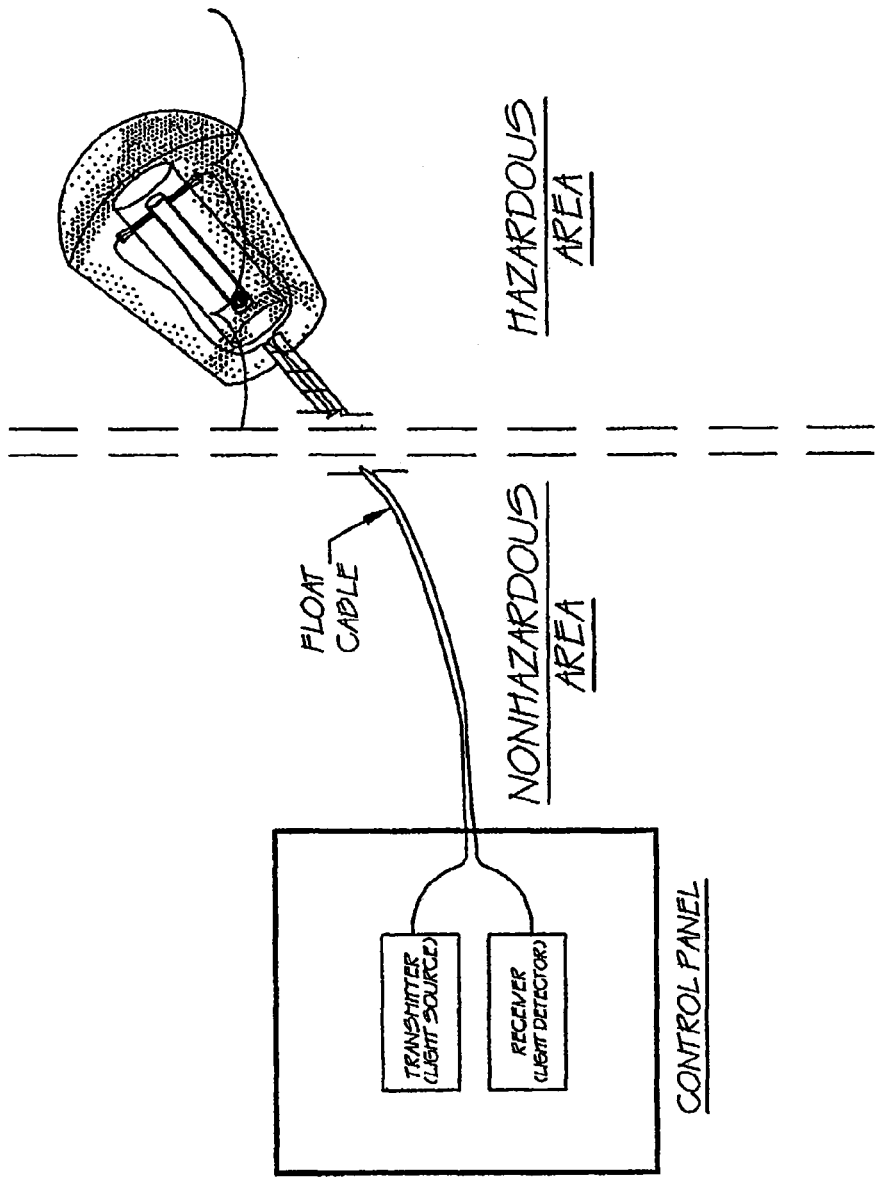
FIG. 3 depicts an optically activated float having a damped switch.

Shown in FIG. 1 is an embodiment of the invention in a float. The invention includes a housing 1, two light guides 2 (hereafter described as fiber optic cables), a light source 3, and a means to interrupt or modify the alignment, here by interposing an object between the distal ends. The housing shown has an interior section. The two cables 2 are preferably positioned into the housing 1. Each cable terminates near, at or within the housing 1. The terminal (or distal) ends of the cables are positioned in the housing near each other, but separated by a gap 10 (see FIG. 1, detail A). The gap 10 is generally positioned in the separator assembly 6 within the housing 1. The separator assembly fixes the relationship of the cable terminal ends and maintains the gap, although this relationship can be fixed through use of the housing alone. The gap can vary in size, with 0.01-0.5 inch suitable for most applications, but could be larger. Some light detectors can sense the presence of light radiation across a gap of up to four inches. The ends of the two fiber optic cables should be "optically aligned," or "optically alignable" that is, light emitted from one terminal end will travel though the gap (possibly along a zig-zag path if reflective material, such as mirrors, are employed to bounce the emitted beam appropriately) and a portion of the transmitted light will enter the terminal end of the second cable. The path may require portions of the housing or movable member to be mirrored or reflective to establish the transmission path. The portion of emitted light that is received at the reception fiber, through the alignment, should be sufficient to allow the light detector to detect the presence of light on the receptor cable. For instance, the two cables may be parallel with 45 degree reflective surfaces positioned at the fiber ends (or other suitable angle, based upon the separation distance of the fibers and the location of the reflective surface) so the two fibers, while parallel, are "optically aligned" by a path reflection off the reflective surface. In any embodiment, the allowed separation of the two fiber ends will depend upon the sensitivity of the light detector and the strength of the source. Suitable sources and detectors can be found at www.fiberopticproducts.com: with sources such as E97 (red 660 nanometers, bright) and detector D92. Using these sources and detectors, the light source can still be detected with an offset of one inch over a gap of about 1 inch.

Figure 4:
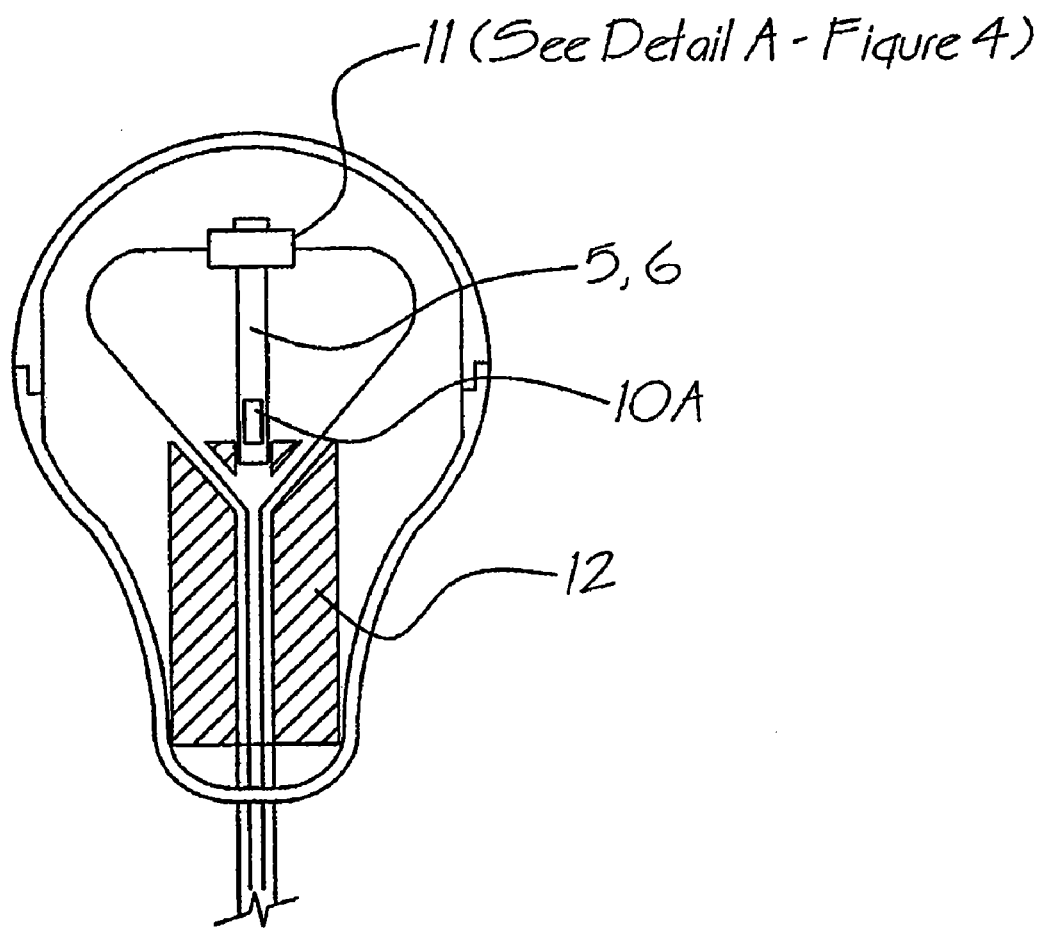
FIG. 4 is a cross sectional view of the float of FIG. 3.
Figure 4:
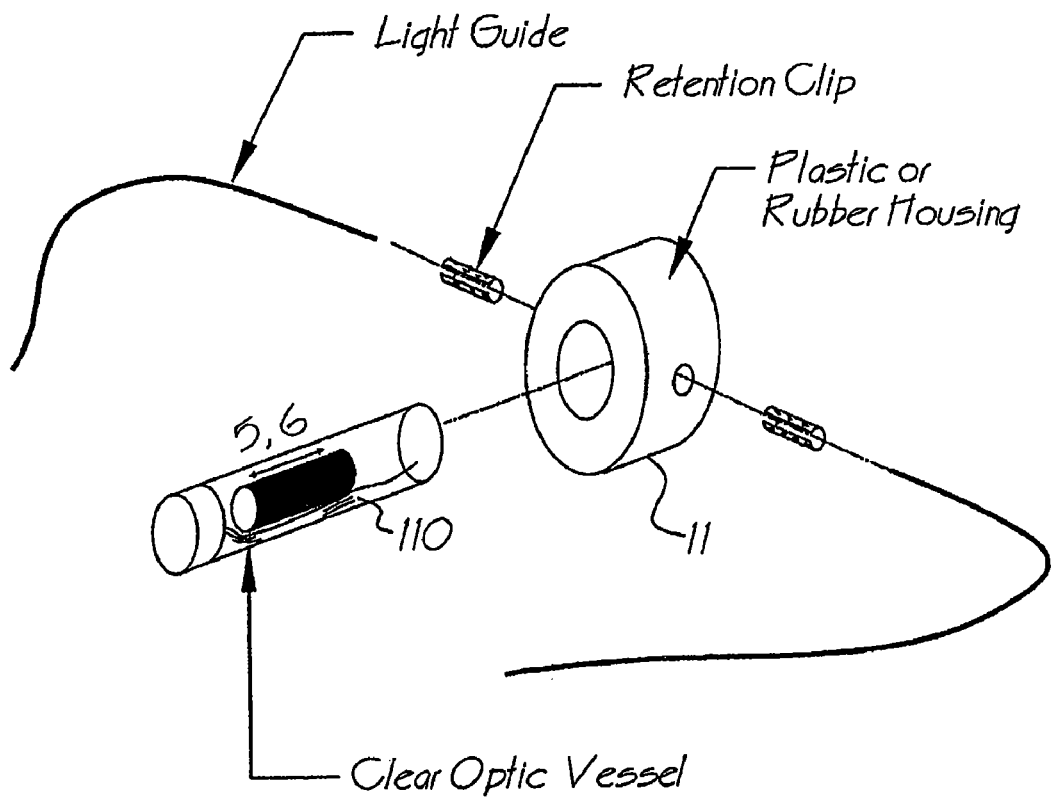

As shown in the detail A of FIG. 1, a preferred separator assembly 6 generally includes an internal chamber 6A with one fiber cable 2 terminal end positioned adjacent to, in or on the wall of the interior chamber and the other fiber optic cable 2 terminal end positioned on an opposite wall of the internal chamber 6A, with the two ends optically aligned. The separator assembly is generally an assembly removable from the interior of the float with the cables positioned on the assembly. Applicant believes it is more efficient to build the separator assembly with attached cables and inserted into the float, than using only a hollow interior with the cables inserted into or attached to the interior walls of the float, although such a design is workable and within the scope of the invention. The separator assembly is not required, but is preferred. For instance, shown in FIG. 4 is a separator assembly 6, comprising a glass or clear plastic ampoule 5. Ampoule contains a slidable bar, ball, or cylinder (or other shape) 10A (a movable member), and has the two light guides coupled on opposing sides of the ampoule exterior through use of a yoke or collar 11. The ampoule or internal chamber is used to restrain the movement of the movable member (e.g, ball, plug), but any device may be employed to restrain or limit the movement of the movable member, that is, a closeable chamber is not required. Separator assembly 6 would be positioned in the interior of the float, usually the separator assembly will be fixedly positioned in the float interior such as with epoxy or a friction fit. As shown in FIG. 4, a collar 12 is used to fix the ampoule in position in the interior of the float, and in some cases collar 12 functions as additional weight to modify the buoyancy and center of gravity of the float as needed. The weight can be lead or other dense material, for instance, steel particles encased in a corrosion resistant (preferably an environmental friendly) material. Yoke 11 and collar 12 could be combined (not shown). A detail of yoke 11 is shown in FIG. 4, detail A. In a non-float embodiment, the separator assembly may not be preferred.

Figure 15:
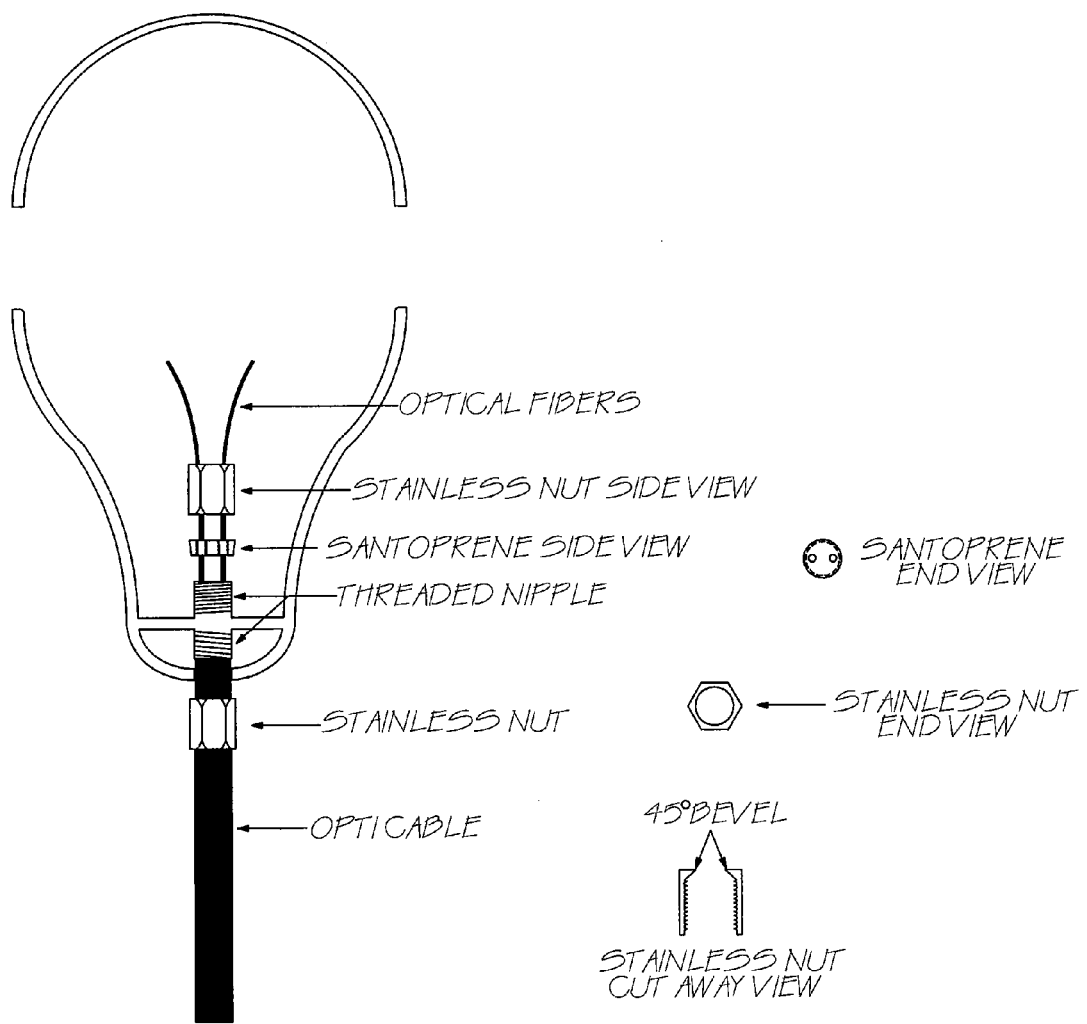
FIG. 15 is a partial cross-section through a float embodiment showing details of sealing method.
Figure 16:
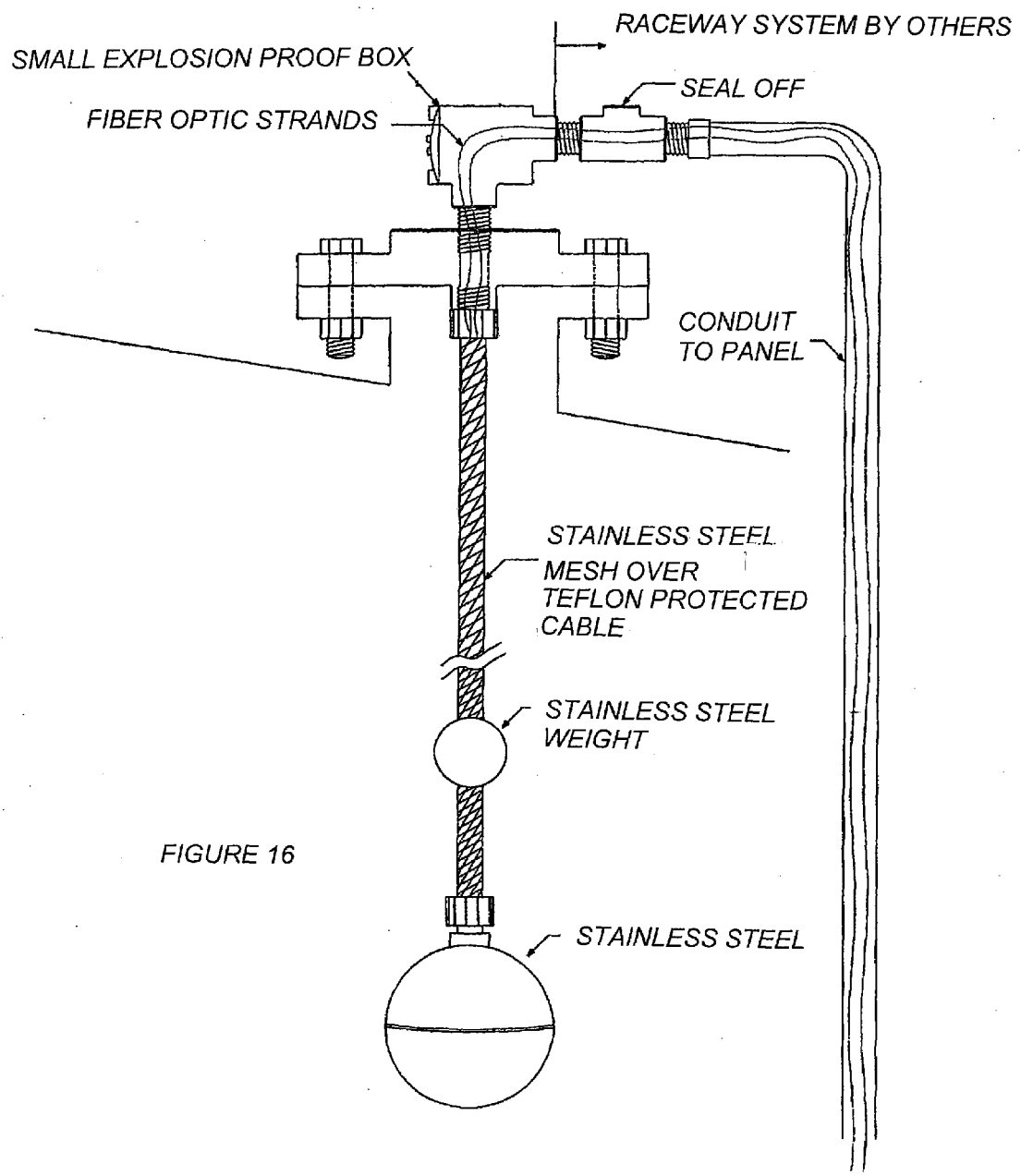
FIG. 16 is a cross section though a tank showing a optical float switch hung from a tank flange.

An alternative separator assembly is shown in FIG. 14. The separator is a flat paddle 60, constructed of flexible plastic. Formed in the paddle are clips 61 to hold the ampoule and optical cables. The paddle 60 is inserted in the bottom ½ of the housing 1A and fixed into position. The paddle may be fixed by potting the bottom of the paddle to the housing portion 1A, leaving the top portion of the paddle free to flex. The top of the housing 1B is then attached to the bottom 1A, such as by RF welding or spin (or friction) welding. As shown, the top of the paddle 60 is not form fitting to the top of the float housing 1B, to allow the top of the paddle (where the ampoule is located) to flex in response to shock forces. For instance, operators have been known to "clean" floats by swinging the float by the tether and slamming the float into a wall. Additional details of a paddle mount (and the float housing) is shown in PCT/US2009/051714, hereby incorporated by reference. Also shown in this PCT is a method of sealing the cables in the housing. An improved method is to externally thread both sides of the cable conduit (41A and 41B in FIG. 8 of the PCT) within the float interior, and to thread the two fibers through a santoprene stopper, shore 72A (santoprene is a thermoplastic vulcanizate material, and may be obtained from Advanced Elastomer Systems, L.P), and then to seal the stopper against with cables by applying pressure through a stainless steel fitting threaded over the stopper (see FIG. 16). The fitting has a beveled internal flange at the top which meshes with the bevel on the stopper as it is tightened, thus forming a permanent seal to seal out liquids. On the bottom of the cable conduit (closest to the cable entry to the float), a similar fitting may be employed, which, when tightened, squeezes the against outer cable jacket, thus making a second seal. This second seal is also designed to crimp into the outer jacket of the cable and prevent movement of the cable, thus allowing the cable to support heavy amounts of debris that can accumulate on a float. (see FIG. 15). A third seal may be used with the bottom fitting. The third seal preferably consists of a flat annular Santoprene washer. When it is installed around the nominal OD overall jacket of the cable and forced inside of ID of the channel, it forms an additional tight seal.

In the embodiment shown in FIG. 1, the housing 1 is floatable, and the cables "tether" the housing 1 to a fixed point, allowing the float to rise and fall with the media for a range of elevations. In some literature, tethered float switches are designed as "tilt" switches or tilt detectors. A tethered or anchored float switch may float on the liquid surface, or indeed, be fully submerged in the liquid, as its height is restrained by the tether or anchor. The two fiber cables 2 are contained in a single cable structure, later described. One of the fiber optic cables is connected to a light source 3, and the other cable is connected to a light detector 5. The light source 3 can be any suitable source, such as a laser, incandescent light bulb, sunlight, a light emitting diode, and light generally refers to any electromagnetic radiation, but for fiber optics, preferably the light source will consists of visible light, infrared light, sunlight, and ultraviolet light; more preferably, light from about 300 nanometers to about 30,000 nanometers in frequency. Preferably the light source 3 and light receiver or detector 5 will be located external to the hazardous area in a control panel or other device (they do not have to be located together), and only the fiber optic cables will travel into the hazardous area to the housing 1.

As shown in the Detail A of FIG. 1, the internal chamber 6A of the separator assembly 6 creates the needed gap between the fiber optic cables 2 terminal ends. Located within the internal chamber 6A is a movable means to interrupt optical alignment 10, such as a rollable or slidable ball or bar or cylinder, or an opaque fluid positioned within the internal chamber partially filling the chamber. If the housing floats, at a certain level the floating housing will tilt (as it is tethered by action of the cable that is tied to an internal or external fixed weight, or the housing is attached to another stationary device with a cable or tether) and as it tilts, the means to interrupt optical alignment will move within the internal chamber due to gravitational forces. If the degree of movement is sufficient, the means to interrupt optical alignment will block (or unblock) the light path between the two terminal ends of the fiber optic cables 2. Additionally, if the housing 1 is a fixed device (that is, it does not float on the media but is fixed at a desired height), the means to interrupt optical alignment can be a floating arm or floating barrier positioned in the internal chamber 6A of the housing. As the water level rises up to the level of the housing, the floating arm or barrier will rise (much like a floating limit switch) to block the light beam (or unblock the light beam). In this instance, the switch will have a means to fix the elevation of the housing, such as a clamp, to attach the housing to a structure in the hazardous environment, such as a dosing pump or to the container storing the hazardous material.

Figure 6:
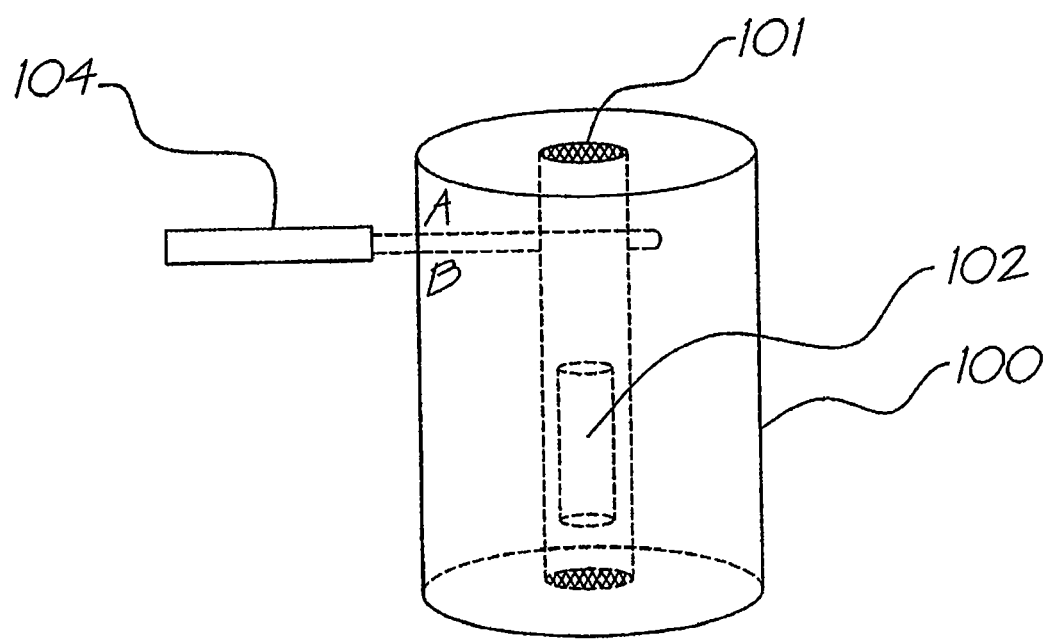
FIG. 6 depicts another embodiment of a float switch.

For example, in FIG. 6 is shown one embodiment, where the housing is a cylindrical shell 100 with an center hollow interior 101 that is open on both ends to the external environment. The housing would be fixed in position in the hazardous environment. Trapped in the interior is an opaque float body 102. The two ends of hollow interior 101 may have a mesh filter covering the openings that retains the float body in the hollow interior. Positioned on opposing sides of the interior 101 are the two optic cable 104A and B. As the fluid in the chamber rises, the float body 102 rises and will block the optical path between the two cables 104 A and B. As mentioned above, the cables do not have to be on opposing sides, but must either be optically aligned, or be optically alignable.

In a float embodiment, a preferred embodiment is a non-orientable float. In such a float, the float body can rotate about an axis through the float (generally, and axis that starts at the tethered cable entry to the float, through the center of the float interior, to exit generally opposite the cable entry). For a non-orientable float, the movement of the movable means to interrupt should be substantially along an axis of the substantially aligned with the axis of float body (generally an axis through the optical cable entry, through the interior of the float exiting at the near the center of opposite end of the float housing). When the movement of the moveable member is substantially aligned with the float axis, rotation of the float about the float axis will not adversely impact the operation of the optical switch.

Figure 8:
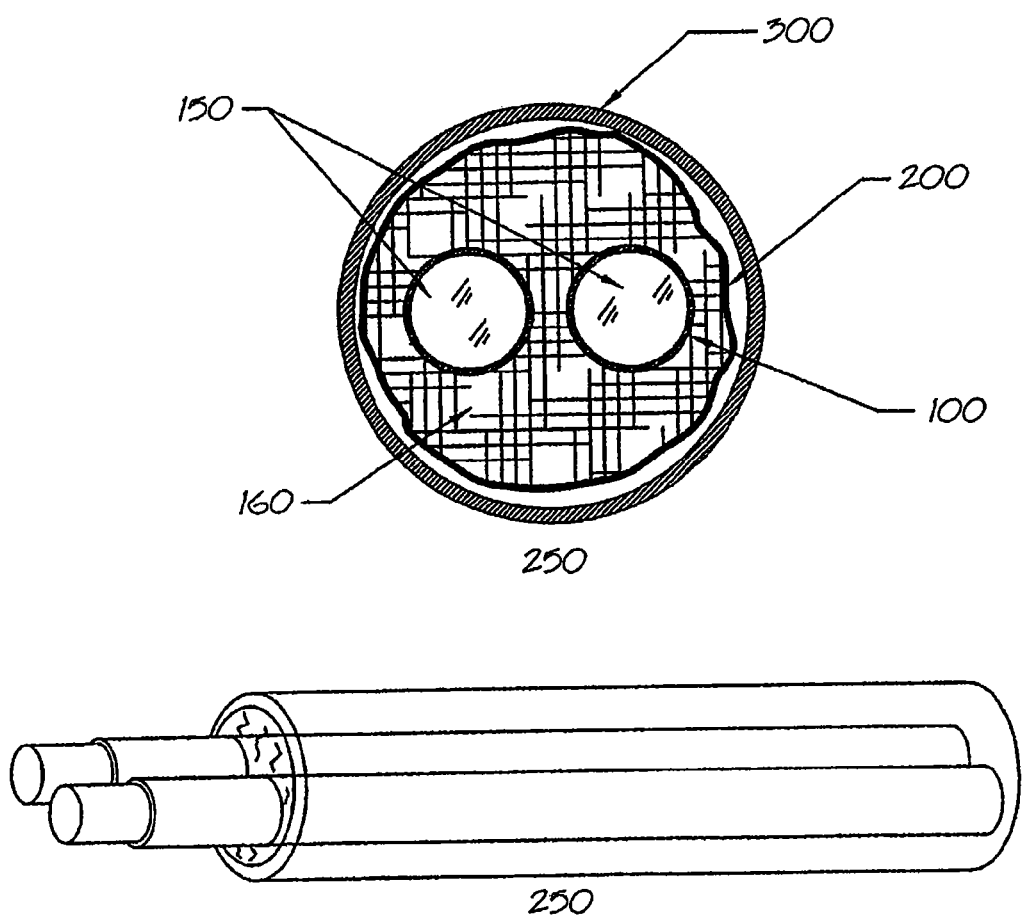
FIG. 8 depicts a tether cable for a float embodied switch.

With a switch in a floatable housing, the optical fibers will bend as the float rises and falls. Over a period of time, the bending of the optic fibers can result in fracture or severing of the fibers, potentially destroying the functioning of the switch. This problem is most acute at the tether point of the cable, as the bending radius of the cable at this location can be small. To help alleviate this, a fairly stout tether cable design is preferred. Shown in FIG. 8 is one suitable design 250. The twin fiber optic cables 150 (here shown as 1 mm diameter sheathed with a polyvinylchloride (PVC) coating 100) are positioned in the interior of an outer sheath member 300, here a 0.020 inch thick PVC extruded watertight jacket, used for strength. More than two optic fibers may be located in the cable. Bendable fibers are more appropriate, such as available from Corning, Inc. as ClearCurve fibers. A preferred fiber is 1 mm diameter polymetyl-methacrylate (PMMA) resin with a polyethylene jacket. With jacket, the overall diameter is of each PMMA fiber is 2.2 mm nominal. One manufacturer is Mitsubishi Rayon Co., LTD. (Tokyo, Japan), type SH 4001. The inventors have found that the PMMA optical fibers are less prone to fracture over repeated bending of the cable. Indeed, the inventors have found the surprising and even stunning result that such a cable design can achieve more than 4,000,000 cycles of flexing without fracturing the fibers. It is believed this is achieveable due to allowance for some fiber movement within the cable, as well as the use of PMMA optical fibers. Other plastic fibers may be substituted for the PMMA.

The fiber-optic cables or light guides are deployed in a filler material 160 in the interior of the extruded sheath 300. As shown in FIG. 8, the filler material is very fine hair-like polypropylene fibers, all contained in a paper or tissue wrap 200, but other fibrous materials may be suitable (Kevlar aramid, polyethylene, polyesters, etc.) This filler material provides tensile strength to the cable, but leaves air gaps within the cable interior. That is, the cable is not a solid cable. As constructed, the interior of the tether cable 250 is substantially filled with minor gaps, leaving some freedom of movement for the optical fibers within the interior. In the design shown, it is preferred that both optic fibers be sheathed to prevent shorting of the switch in the cable (particularly for the use of side glow cables (not preferred), for end glow cables, this may not be necessary). For long tether lengths, it may be preferred to include a strong reinforcing cable, such as a steel, Kevlar, carbon fiber, etc. cable within or attached to, the tether cable structure. The cable shown in FIG. 8 houses two optic fibers. The cable may contain more than two fibers. As described, this cable design is similar to traditional copper or electrical conductors. Traditional optical cables are solid cables and are difficult to strip the cables to access just the optical fibers. Further, in a solid cable, bending of the cable results in a similar bend in the fibers, as the fibers cannot move within the cable interior. This preferred embodiment cable design has the benefits of ease of stripping, and allowance for fiber movement. Other filler material may be used.

In a float embodiment containing the optical switch, the float may reach a position where the switch will "flutter" between an optical path open or "blocked" position or optical path closed or "complete" position due to inherent instabilities in a float embodiment. For instance, the float's position may jitter due to surface waves in the fluid environment. This float jitter may cause the slidable or rollable means to interrupt optical alignment (or the switch activator) located in the float interior to move back and forth, causing the switch status to rapidly move between open and closed (note, switch "open" can be interpreted as path blocked or path complete, depending on how the device connected to the switch circuitry is configured to respond to the status of the switch). To reduce switch "flutter" a damped switch can be employed by including a means to dampen the switch activator or the means to interrupt optical alignment. The optical switch may be damped through a variety of means. For instance, in the embodiment shown in FIG. 4, detail A, the ampoule may be filled or partially filled with a damping fluid 110, such as mineral oil or other clear or light transmissive fluid. The fluid in the ampoule serves two purposes, lubrication (to help prevent the rollable or slidable means to interrupt from scratching the walls of the ampoule and possibly modifying the optical characteristics of the ampoule walls) and acts as a damping force, creating a drag on the bar or ball reducing sudden movements of the bar or ball. When a damping fluid is used, it is preferred to separate the fluid from the light guides (such as by having the fluid contained in an ampoule) to avoid contamination of the light guide distal ends by the damping fluid. The amount of fluid in the ampoule can vary from a few drops to fully filled.

Figure 7:
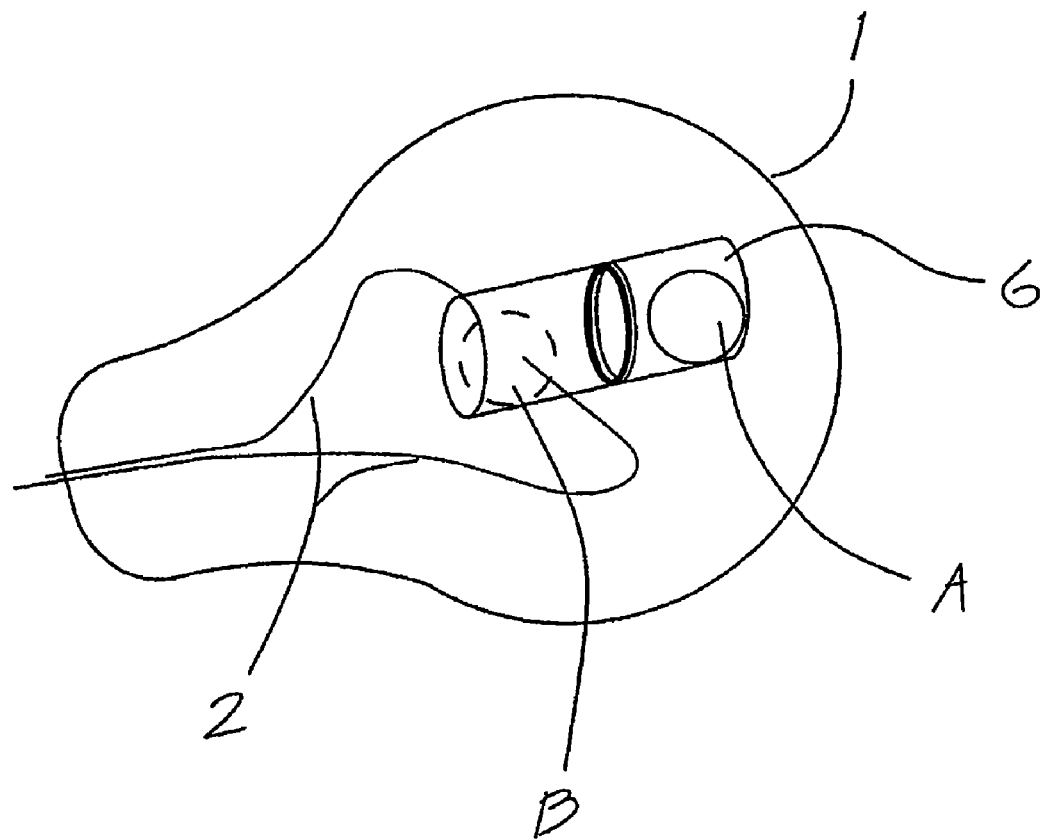
FIG. 7 depicts another embodiment of a float switch with a delay ring.

Alternatively, a slidable bar, ball, cylinder or other structure could be used with the sides of the structure roughened (or the interior walls of the ampoule could be roughened or have added ridges) to create additional surface area resulting in additional frictional forces opposing a sudden movement of the bar. For instance, shown in FIG. 7 is a ring or annulus positioned in the separator assembly chamber 6. A rollable ball is used as the slidable member. The ring in the housing chamber insures that a ball positioned in the chamber will not move from position A (unblocked) to position B (blocked) without a sufficiently large enough movement of the housing to allow the ball to roll over the ridge created by the ring. The ending position of the ball would not be altered by minor fluctuations in the float position. Also, an hourglass shaped vessel may be used, where the neck of the hourglass can pass the slidable or rollable ball, specially designed segmented cylinders, other movable structure, or other light blocking device (e.g. opaque liquid). In this instance, the shape of the chamber is used to control switch flutter.

Another means to deal with switch flutter is to allow the light to blink, flash or pulse periodically, and a change in status of the switch is detected by the presence or absence of a suitable number of pulses. For instance, if the light path is initially blocked, and the status changes, the change will be noted after detection of so many consecutive light pulses (detection of, say 5, consecutive flashes, detecting the presence or absence of a predetermined number of flashes over a predetermine time interval helps reduce switch flutter); if the light path is not blocked, then a change in status would be detected after detection of the absence of a certain number of pulses or flashes of light over a predetermined time interval. This is generally not preferred as it increases the complexity of the circuitry tied to the switch, but may be useful where the lifetime of the light source is an issue.

Another means to deal with switch flutter is not to use a constantly "on" light source. Instead, the source can remain off until the switch is "polled" for its status. For instance, the electronics tied to the switch, such as a controller (e.g. PLC or microcontroller), may interrogate the status of the switch every second, and turn the light source on once per second for a designated time, and "look" for the return status, e.g., either light blocked or light present on the return optical fiber. Alternatively, the light may stay on, and the status of the switch polled at the light detector. Again, this is not preferred, as it increases the complexity of the circuitry tied to the switch. To reduce switch flutter, the change in switch status should be consistent for a selected period of time.

Another method to reduce switch flutter is to use magnets suitably positioned in the separator assembly in conjunction with a cylinder or slidable bar or structure composed of magnetably interactive material. Shown in FIG. 12 is a cartoon depicting the movement of a slidable magnetic interactive cylinder or slug (here an 18-8 cold formed ³⁄₁₆" D×½" L stainless steel cylinder (sometimes denoted 300 series stainless steel having approximately 18% chromium and 8% nickel)) in an ampoule, and a "horseshoe" magnet positioned in the interior of the float where the two ends of the horseshoe near the sides or ends of the ampoule. The horseshoe magnet is shown for purposes of explanation and is not preferred. As the float moves from position A through position D, rotating "upwardly," the slug "sticks" to ampoule near the magnet, say near the N pole of the magnet. Before or at position E, the gravitational force overcomes the magnetic force and the slug slides downwardly, thus unblocking the optical path through the ampoule. As the float rotates from position E downwardly (not shown), the slug will again stick to the ampoule near the S pole of the horseshoe magnet and will release when the float returns to a position before or at position A. As used herein, a weak magnetic interaction means that for a given magnet and slug or moveable structure (or vice versa, where the magnet moves), the magnetic force exerted between the slug or device and magnet is insufficient to overcome the gravitational force acting on the slug, thereby allowing the slug to be released at some point as the position of the slug approaches vertical, as shown in FIG. 12.

The actual release point of the slug can vary by modifying the strength of the magnet, the weight of the slug, or the magnetizability of the slug's material. In use, the location of the magnets can vary. For instance, in FIG. 12, detail A, two magnets M1 and M2 can be positioned at or near each end of the ampoule or chamber (either internal or external to the chamber) (by using two different strength magnets, the release point of the slug on an upward rotation can be different for the release point on a downward rotation). Other configurations are possible, for instance using a single donut style magnet positioned around the middle of the chamber or a bar magnet positioned near the middle of the chamber, or using a magnet as the slug and positioning weakly magnetic material at each end of the ampoule or chamber.

Figure 13A:
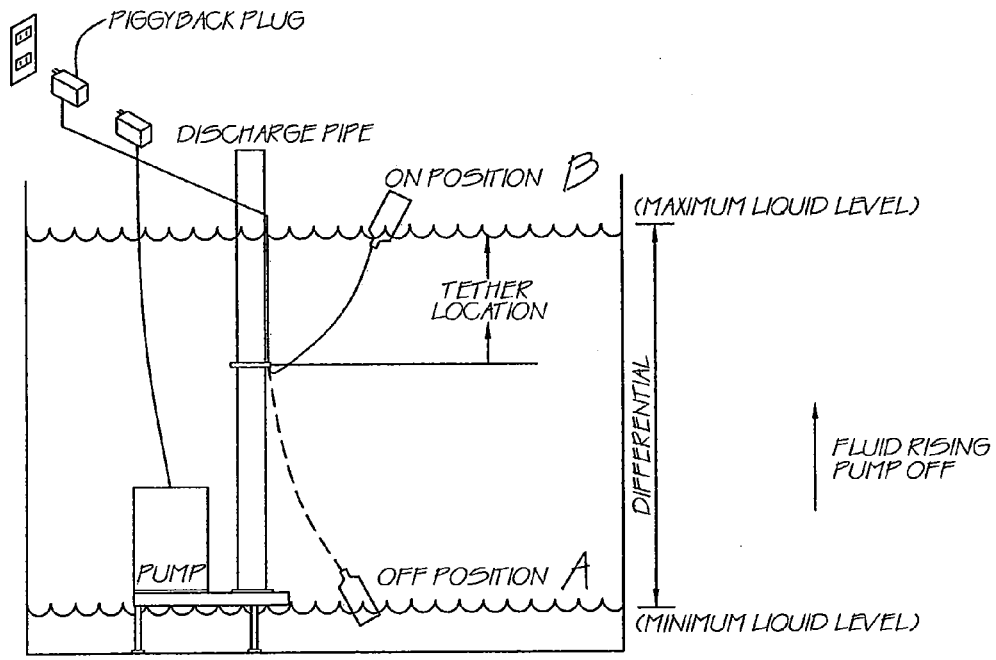
FIG. 13A depicts the operation of a wide angle float as the pump chamber fills.
Figure 13B:
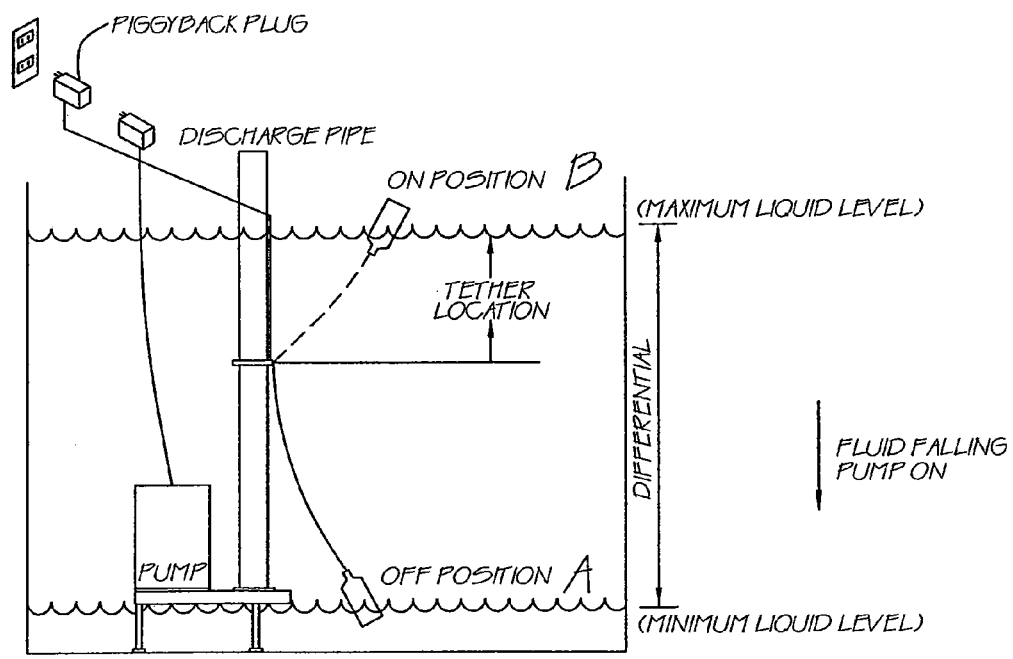
FIG. 13B depicts the operation of a wide angle float as the pump chamber is pumped down.

The use of the magnet and magnetically interactive slug allows the switch to remain in its last configuration (e.g. complete optical path or interrupted optical path) over a selected range. This allows the float to operate as a "wide angle" float switch. Shown in FIG. 13 is a typical wide angle pump switch operation. In FIG. 13A, the pump chamber fills with fluid and the pump remains "off" until the float reaches position B. At position B, the pump turns on. As shown in FIG. 13B, the pump remains "on" as fluid is pumped out until position A is reached, at which time the pump turns off. A delay means can also be an electronic circuit (such as a timer or RC circuit) that delays the alteration of the switch from one state (e.g. switch "on" or active), to a second state (e.g. switch off or inactive). In this instance, while the delay means does not delay the movement of the movable member, it delays recognition that the movable member has moved, and for purposes of this invention, is also considered as a "delay means" or a "means to delay movement of the delay member." Fluid, as used herein, can include flowable solids (capability of loose particulate solid to move by flow), such as flours, grains, corn, beans, liquid mashes, sands, etc.

Figure 11:
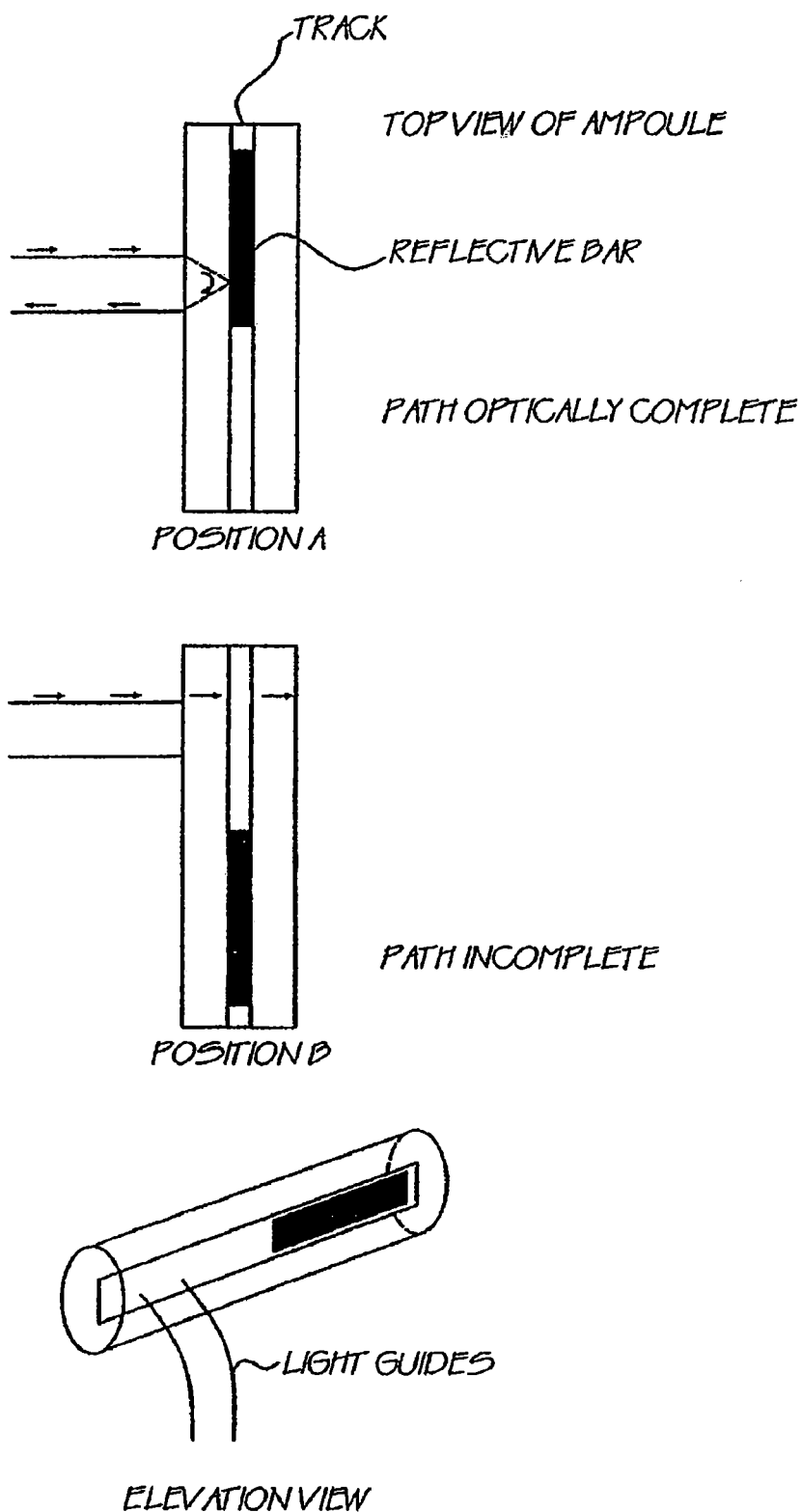
FIG. 11 depicts a top view of an ampoule with two parallel same side optical fibers where the two fibers are optically aligned by position of the reflective bar at position A and where the two fibers are optically non-aligned (or optically interrupted) by position of the reflective bar at position B.

The switch as described uses optically aligned light guides and a means to interrupt optical alignment by interposing an object. Alternatively, the light guides may be optically aligned by a light path that bounces off a reflective moveable member, such as a reflective bar. Sufficient movement of the slidable object destroys the bounce path, and hence, results in non-alignment of the distal ends of the light guides. In this configuration, the switch activator (the sliding bar, cylinder, ball, etc) is the means to interrupt optical alignment upon suitable movement. For instance, the fibers may be parallel, but offset, positioned on the exterior of the ampoule, as shown in FIG. 11. Positioned in the ampoule is a slidable reflective bar (the ampoule may have a track for the bar to slide in, or be suitably shaped (e.g. rectangular prism), to maintain the orientation of the bar in the ampoule, however, if the receptor is sensitive, a reflective cylinder or ball may be used in a cylindrical ampoule, as some scattered light will be detected by a sensitive detector, such as the D92 detector). When the bar is interposed between the distal ends (position A), the reflective surface creates optical alignment. When the bar is not interposed, optical alignment is destroyed (position B).

Instead of moving an object between the optical fiber distal ends to modify the optical alignment, one end (or both ends) of the fibers could be movable between a first position of optical alignment of the distal ends and a second position of optical non-alignment, such as by moving one end (e.g. having that end mounted on a sliding bar) to move sufficiently so that the optical alignment is interrupted, or having both ends move to either align the distal ends or interrupt the optical alignment, such as by moving both fibers in unison until a fixed object is interposed between the two fiber ends. These arrangements are not preferred, as movement of the fibers places stress on the fibers and repeated movement may result in fracturing the fibers.

A floating housing 1 can be constructed in any number of ways. One such way would be to use foam in a two part mold, encasing the separator assembly within (or by welding two half floats together). The housing can also could be constructed of two halves fused together by glue or heat, or welding (e.g., spin welding for thermoplastics, electrical welding for metals (e.g., stainless steel floats)) with the separator assembly located within the housing. Any object that floats could be drilled or carved out and the separator assembly (if employed) could be inserted inside and then sealed using any number of means, including plastic injection molding methods.

The receiver or detector 5 can be located external to the hazardous area in a control panel or other device, and is not required to be located with the light source. Any number of commercially available devices that are sensitive to light energy, such as devices containing a photo eye or photo transistor, are suitable as a light detector or receiver. The presence or absence of light, through the switch, detected at the receiver, is indicative of the position of the floating housing in the environment. The status of the switch can be utilized as a signal means to perform a specific task such as starting or stopping a pump In a float activated switch, it is preferred that a top portion of the float be of a contrasting color from the bottom of the float, or contain a contrasting pattern (such as a bullseye), so that the orientation of the float can be discerned by looking at the float, even in dirty water. One configuration has the top of the float a light color, with the bottom of the float a darker color. This two toned float configuration (multi-toned configurations could be used) allows an operator to tell if the float is facing up or down simply by inspection. The exterior of the float housing thus has an indicia to allow a viewer to identify the orientation of the float.

Figure 5:
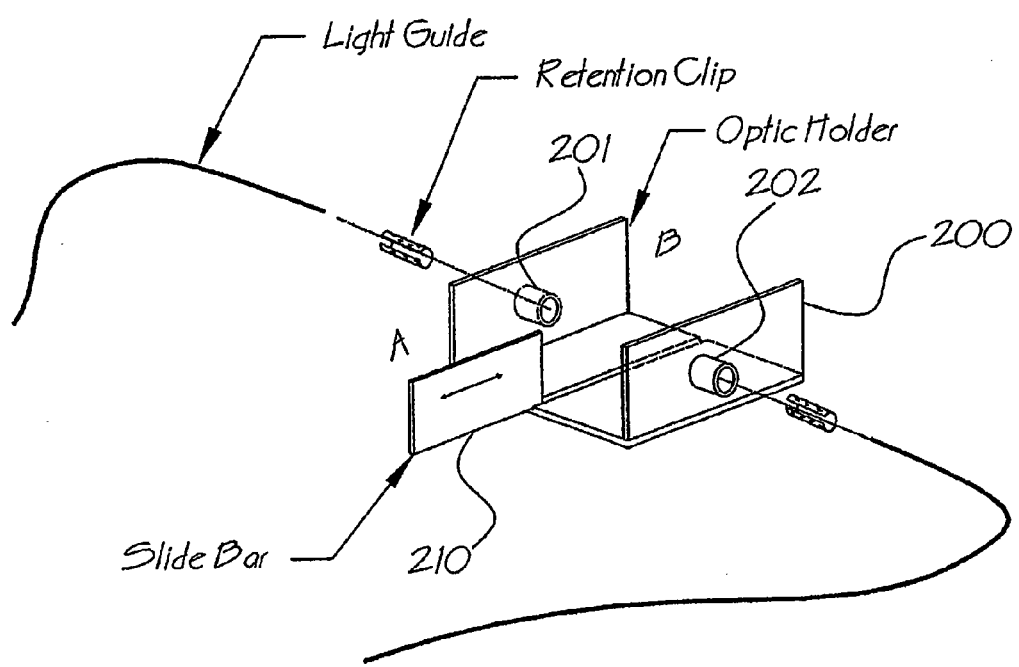
FIG. 5 depicts a switch operated mechanically or manually.

The invention is not limited to a float embodiment. For instance, the switch components (housing, light guides, means to interrupt optical alignment and light source and light detector) can be used as any type of switch. For instance, shown in FIG. 5 is a device switch. The switch has a housing 200 (here a plate with two upstanding flanges) into which a first 201 and second 202 light guide are mounted and separated by a gap, but optically aligned. One of the light guides is connected to a light source, another to a light detector. Slidably mounted to the plate is slide 210. Slide is movable between positions (e.g. position A, blocking transmission, and position B, allowing transmission) between the light guides 202 and 201. FIG. 5 depicts a "slide" switch type, but any type switch device can employ the optical components, including a toggle type switch, push button type switch, rotary type switch, rocker type switch, key activated switch, limit switch, proximity switch or other type of manually or mechanically operated switch where the operation of the switch occults or blocks the light path or otherwise interrupts optical alignment (or as later described, modifies the transmitted characteristics of the source light) between the two light guides, through manual or mechanical activation (e.g. relay operation of the switch activator) as opposed to gravity operation by a float switch.

As a general purpose switch, the optical switch may incorporate a means to modify the received characteristics of a light beam, allowing the switch have multiple "statuses," instead of simply on or off. Such a switch could be used to control devices with selectable settings (such as selecting the speed of a motor) or if the allowed variation is an analog variation, the switch can operate as a "dimmer switch" or continuously variable switch. For instance, the slidable bar could be a stepped density filter or a stepped transmission filter, such as available from Edmund Optics (www.edmundoptics.com) as model numbers 147-524, 147-525, 147-526 or 147-527. These models have eleven regions of different transmission characteristics (e.g., different density, thus modifying the transmitted lights amplitude characteristics). In this embodiment, the slidable bar does not totally block the light path at all positions on the bar, but generally allows partial transmission through the bar. Hence, the relative position of the bar with respect to the cable ends within the float interior or separator assembly can be determined based upon the amount of light received by the light receptor after passage through the bar. Hence, the amount of light transmitted through the bar can be used to allow the device to function as a multiple position switch, to control devices having selectable positions.

Instead of modifying the degree of light transmission though the bar, other parameters could be used to modify the received characteristics of the source light, such as polarization or frequency. For instance, if the bar had four regions of different color, the light transmitted through the bar will vary in color or frequency based upon the position of the bar with respect to the source of light. The relative position of the bar (as detected by reception of a different color or frequency of light) can then be used to perform different functions (e.g., start pump 1, start pump 2, etc). A continuous or analog gradation in transmission characteristics could also be used instead of a stepped bar as a "dimmer" type of switch to control a variable speed motor. Another type of dimmer or continuously variable type switch would be two polarization filters, one fixed and one rotatable, with the distal ends of the fibers aligned through the polarized lenses. By rotation of one of the polarization filters (such as by mechanical or manual activation of the switch activator), the amplitude of the transmitted light can be varied in a continuous manner. All of the above are considered a means to modify the received characteristics of a light beam. Indeed, the "means to interrupt optical alignment" is also a "means to modify the received characteristics of a light beam" as the modification is the non-transmission or non-reception of the light beam by operation of non-alignment of the distal ends or by interposing a light opaque object between the distal ends.

Further, the optical switch can accommodate "three way switches" or multiple pole, multiple throw type switches. Additional light fibers or light sources/receivers may be needed for a particular application. For instance, for a three way switch, each switch has three distal fiber ends (here denoted the source, the common, and the traveler). The "traveler" optical fiber is to run between the two switches. Each three way switch contains a mirror or other reflective surface that provides optical alignment within the switch between the "source wire" and either the traveler or the common within each switch, and interrupts optical alignment with the non-selected path. That is, the light beam in a three way switch has two possible routes through the switch, and the route through the switch selects the path (by movement of the switch activator). Again, instead of moving a reflective surface, the optical fiber could be moved by operation of the switch.

Generally, for a switch embodiments described, the housing (or at least that portion containing the distal ends of the light guides and the gap therebetween (such as the separator assembly) will be substantially lightproof, and it is preferred that the housing itself be substantially lightproof with the switch activator or actuator (the slide, pushbutton, toggle, etc), for manual operation, extending through the housing. The distal ends of the light guides are located in the interior of the housing in order to keep the optical switch components isolated from external light sources (such as ambient light) which might provide a false reading. If ambient light is not an issue (e.g., the light source is a non-common frequency, or bursts of light are used, or highly directional fibers are used, etc), the housing does not need to be light proof, and simply is used to define a gap between the distal ends of the light guides, such as shown in FIG. 5.

Figure 9:
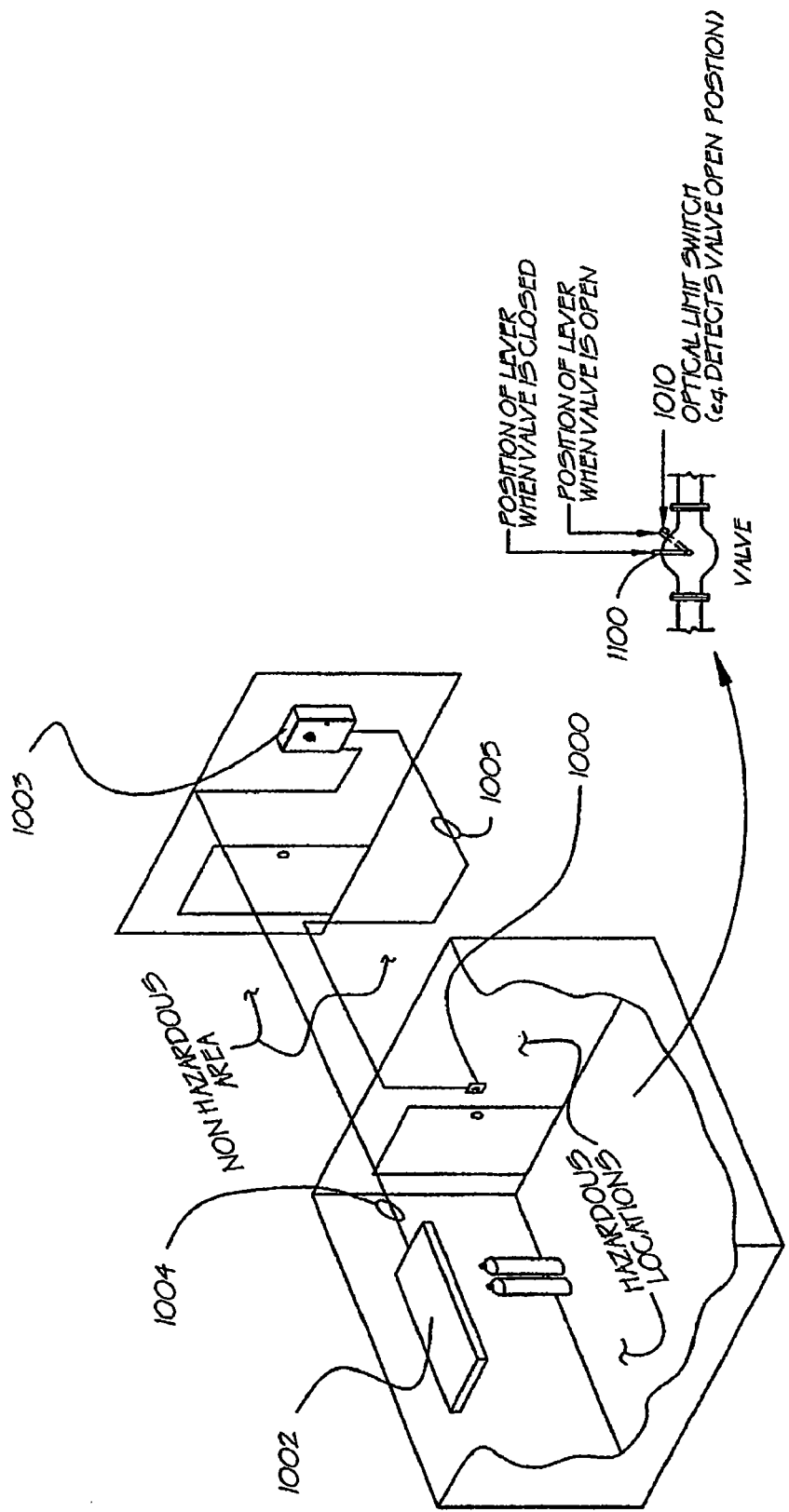
FIG. 9 depicts a light and a limit optical switch located in a hazardous environment.
Figure 10:
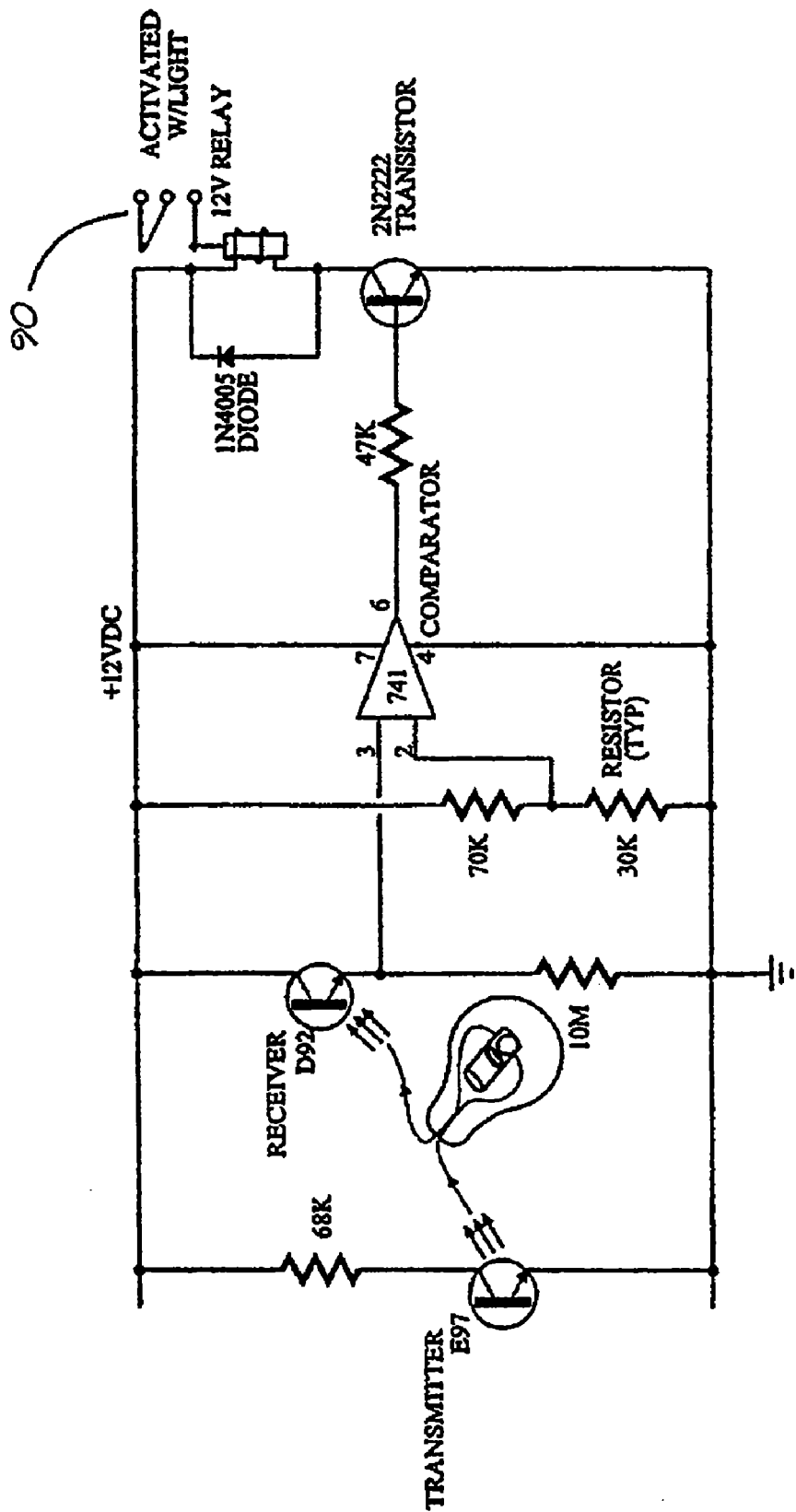
FIG. 10 is a representative circuit diagram incorporating the switch, and used to power a device.

The switch as described could be positioned within the hazardous environment, such as adjacent to (or attached to) an explosive proof housing containing a device (e.g., a motor or pump within the interior of the explosive proof housing). The light source and light detector utilized by the switch can be located in a remote switch panel or other remote device, and located separately if desired. Alternatively, the source and detector can be located in the interior of the explosive proof housing, and the light guides from the switch (within the hazardous environment) routed into the interior of the explosive proof housing through an explosive proof connector (the interior of an explosive proof container is considered to be remote from the hazardous environment). See FIG. 9, showing an optical toggle light switch 1000 operating a light fixture 1002 located in a hazardous environment, and is wired through an explosion proof conduit 1004 (or using explosion proof wire), to a panel 1003 located outside the hazardous environment (the light may be wired to an explosion proof panel in the hazardous environment). The light fixture 1002 is in an explosion proof housing, but the optical switch 1000 is not. The optical switch light guides 1005 proximal ends are located in the panel 1003 and connected to the light source and light detector. The status of the switch is detected in the panel 1003, such as through use of a circuit (one suitable circuit is shown in FIG. 10), which circuit will power or de-power the light fixture based upon the detected switch status. In this fashion, an operator located in the hazardous environment can deactivate or activate the electrical device at or near the device itself, instead of at a remote switch panel or activation using an expensive explosion proof housing for the switch. FIG. 9 also shows an optical limit switch 1010. This optical switch can be connected to panel 1003 using light guides 1005 (not shown). This limit switch is activated by a level arm 1100 of a valve or other device that activates or deactivates the optical limit switch 1010.

The circuit in FIG. 10 shows the light source (E97) and light detector (D92) with the corresponding optical fibers connected to a float embodiment of the optical switch. The circuit is designed to have the relay de-energized when the return optical fiber is dark, that is, when the detector fails to detect light on the return optical fiber. If light is detected, the relay is energized, closing switch 90, which is used to connect power to the light fixture located in the hazardous region.

In this fashion, the powered components of the optical switch are electrically isolated from the hazardous environment, and the only energy present within the hazardous environment is a light beam. In a hazardous environment, such an optical switch presents a safe and economic alternative to conventional switches using an electrical contact in the hazardous environment that present a potential source of electric spark and ignition within the hazardous environment.

Another float embodiment for use in storage tanks consist of a stainless steel float (or other inert material) of suitable shape (ball, sausage shape, a cylinder with flat or domed ends, etc) with an optical activator positioned therein, on the cable beyond the tether point. One connecting optical cable can consist of the fiber optic fibers, either jacketed or unjacketed, installed inside of a hollow flexible tube or hose, made from a number of possible inert materials (inert to the intended environment). For instance, for use in a hydrocarbon storage tank, a flexible polytetrafluoroethylene (PTFE) (e.g. Teflon) jacket may be used, or a braided stainless steel jacket (e.g., type 316 stainless). A teflon tube may also have an overall jacket of braided stainless steel or other materials which will add to its ruggedness and/or chemical resistance. The individual optic fibers, preferably comprising PMMA fibers with a polyethylene jacket, are housed by the jacket. The body of the float is coupled to the tube with compression or mechanical fittings made of 316 stainless steel.

The distal end of the tube is connected to an inert fitting (e.g., 316 stainless steel) which can be connected to any number of other devices. A preferred terminating device is a threaded flange to which the tube is connected on the interior facing face of the flange, and a terminating box, such an explosion proof fitting, on the exterior facing face of the flange. A channel through the flange allows the fibers to connect in the terminating box.

As described, the optical float hangs downwardly from a top tank flange into the tank interior. The float is tethered to a fixed or removable fixture within the tank, such as a pipe, rod, cable or chain. Alternatively, the float may be effectively tethered by placing a weight or "anchor" on the float cable that has sufficient weight to overcome the buoyancy of the float, and thus to restrain the height of the float, even when fully submerged in the tank liquid. See FIG. 16. Generally connected to the terminating box is a conduit that will route the optical fibers to a remote panel for connection to the electrical equipment (light source/receiver, power, etc). Alternatively, the electrical equipment may be located at the terminating box, but such is not desired, as explosion proof housings may be required.

While the present invention has been described in connection with a number of embodiments and implementations, the present invention is not so limited but covers various obvious modifications and equivalent arrangements.

The invention claimed is:

1. An optical float switch comprising a floatable housing having an interior, a first and second light guide each having proximal and distal ends, said proximal end of said first light guide connectable to a powered light source located remote from said housing, said proximal end of said second light guide connectable to a powered light detector located remote from said housing, said first and second light guides distal ends positioned into said housing and said distal ends being separated by a gap within said interior, said optical switch further having a means to modify the received characteristics of a light beam ("means to modify"), said means to modify adapted to be movable with respect to at least one of said distal ends of said light guides between a first position where said means to modify occupies said gap, and a second position where said means to modify does not occupy said gap.

2. The optical float switch of claim 1 wherein said distal ends of said light guides are located in a separator assembly positioned in said housing, said separator assembly having a hollow interior portion.

3. The optical float switch of claim 2 wherein said means to modify modifies the amplitude, frequency or polarization of a light beam.

4. The optical float switch of claim 2 wherein said separator assembly further has a means to dampen said means to modify, said means to dampen said means to modify is a fluid located in said interior of said separator assembly.

5. The optical float switch of claim 4 wherein said separator assembly comprises an ampoule.

6. The optical float switch of claim 4 wherein said means to modify is an opaque fluid positioned in said interior of said separator assembly.

7. An optical switch comprising a housing having an interior, a first and second light guide, said first and second light guides having distal ends positioned into said housing and said distal ends being separated by a gap within said interior, said optical switch further having a means to modify the received characteristics of a light beam ("means to modify"), said means to modify adapted to move one of said distal ends between position A and position B, where said distal ends are optically aligned in at least one of said positions A or B, and not optically aligned in the other of said positions A or B.

8. An optical switch comprising a housing, a powered light source and a powered light detector, said light source and light detector located remote from said housing, said light source connected to said housing with a first light guide, said light detector connected to said housing with a second light guide, said first and second light guides having distal ends positioned in said housing and said distal ends being separated by a gap and a means to modify a transmitted characteristic of a light beam, said means to modify a transmitted characteristic of a light beam adapted to be movable with respect to at least one of said optically aligned distal ends between position A and position B.

9. The optical switch of claim 8 wherein said optical switch includes an activator, where said activator is a toggle, push button, rotary dial, rocker, or key activated activator, or mechanical lever of a limit switch.

10. The optical switch of claim 2, wherein said means to modify is a means to modify optical alignment of said distal ends.

11. A method of detecting the level of a liquid in a hazardous explosion prone environment, the method comprising the steps of deploying an optical switch in a hazardous explosion prone environment, said optical switch comprising
a floatable housing having an interior, a first and second light guide each having proximal and distal ends, said proximal end of said first light guide connected to a powered light source located remote from said housing in a non-hazardous environment, said proximal end of said second light guide connected to a powered light detector located remote from said housing in a non-hazardous environment, said first and second light guides having distal ends positioned into said housing and said distal ends being separated by a gap within said interior, said optical switch further having a means to modify the received characteristics of a light beam ("means to modify"), said means to modify adapted to be movable with respect to at least one of said distal ends of said light guides between a first position where said means to modify occupies said gap, and a second position where said means to modify does not occupy said gap;
and emitting a light from said light source located remote from said hazardous explosion prone environment for transmission by said first light guide, and examining said second light guide with said light receiver at a location remote from said hazardous explosion prone environment for the presence or absence of a light.

12. The optical switch of claim 10 said further having a flexible cable coupled to said housing.

13. The method of claim 11 wherein said hazardous environment is within a pumping station or treatment tank.

14. The method of claim 11 wherein said light source emits light in pulses at periodic intervals and said step of examining said second light guide with said light receiver is undertaken to detect at the presence or absence of a predetermined number of light pulses over a predetermined time interval.

15. The method of claim 11 where said step of emitting light from said light source is undertaken upon request of a controller.

16. The method of claim 11 where said step of examining said second light guide with said light receiver is undertaken upon request of a controller.

17. The optical switch of claim 7 further having a magnetic means interacting weakly with a material interacting with said means to modify the received characteristics of a light beam.

18. A optical float system for use in a fluid, comprising an optical float switch comprising a floatable housing having an interior, a powered light source and a powered light detector, said light source and light detector located remote from said housing, said light source connected to said housing with a first light guide, said light detector connected to said housing with a second light guide, said first and second light guides having distal ends positioned into said housing and said distal ends being separated by a gap within said interior, said optical switch further having a means to modify the received characteristics of a light beam ("means to modify"), said means to modify adapted to be movable with respect to at least one of said distal ends of said light guides between a first position where said means to modify occupies said gap, and a second position where said means to modify does not occupy said gap, said optical float system further comprising an optical cable connected to said floatable housing, said optical cable comprising said first and second light guides, said light guides disposed in a filler material and surrounded by an inert fluid-tight jacket, said filler material adapted to allow said optic fibers to shift in the cable interior.

19. The optical float system of claim 18 further comprising a fluid tank having an interior and exterior portion, said optical float disposed in said tank interior, said optical cable exiting said tank.

20. The optical float system of claim 19, where said fluid is selected from a liquid hydrocarbon, liquid chemicals, or waste waters.

21. The optical float system of claim 19, where said fluid is a flowable solid.

22. A moveable optical switch comprising a movable housing, a first and second light guide, each having proximal and distal ends, said first light guide connectable to a light source at said first light guide proximal end, said second light guide connected to a light detector at said second light guide proximal end, said optical switch having a separator assembly, said distal ends of said first and second light guides positioned in said separator assembly, said separator assembly coupled to said housing so that said separator assembly moves in response to movement of said housing, and said distal ends of said first and second light guides being adjacent but separated by a gap and a means to modify a transmitted characteristic of a light beam, said means to modify a transmitted characteristic of a light beam adapted to be movable with respect to at least one of said distal ends between a first position A and a second position B, said distal ends being optically aligned in at least one of said first position A or said second position B, said housing being movable, and said means to modify a transmitted characteristic moving in response to movement of said housing, and said first and said second light guides bending between said distal and said proximal ends with movement of said housing.

23. The optical switch of claim 22 wherein said housing has an indicia positioned on said housing to allow a user remote from said housing to detect an orientation of said optical switch in said first position A or said second position B.

24. The optical switch of claim 22 wherein said separator assembly further comprises a means to dampen said means to modify.

25. The optical switch of claim 22 wherein said first and said second light guides are positioned in a cable between said proximal and said distal ends, said cable comprising an outer sheath, an inner wrapping, and a fibrous material disposed within said inner wrapping, where said first and said second light guides are each jacketed and disposed within said filler material.

26. The optical switch of claim 24 wherein said means to dampen said means to modify is a fluid located in said interior portion of said separator assembly.

27. The optical switch of claim 22 wherein said separator assembly comprises an ampoule.

28. The optical switch of claim 22, wherein said distal ends of said first and second light guides are parallel and side by side.

29. The optical switch of claim 22 further comprising a pump, said pump being activated when said means to modify is at one of said first positions A or said second position B, and deactivated when said means to modify is at the other of said first positions A or said second position B.

30. The optical switch of claim 22 further comprising a paddle insert, said paddle insert having a top edge, side edge and bottom edge, a top portion and a bottom portion, said top portion of said paddle insert being free to flex in the interior of said housing, said distal ends of said first and said second light guides mounted on said paddle insert.

* * * * *